March 20, 1928.
C. R. BRYANT ET AL
1,662,844
AUTOMOBILE RADIATOR SHUTTER
Filed Feb. 15, 1926
3 Sheets-Sheet 1
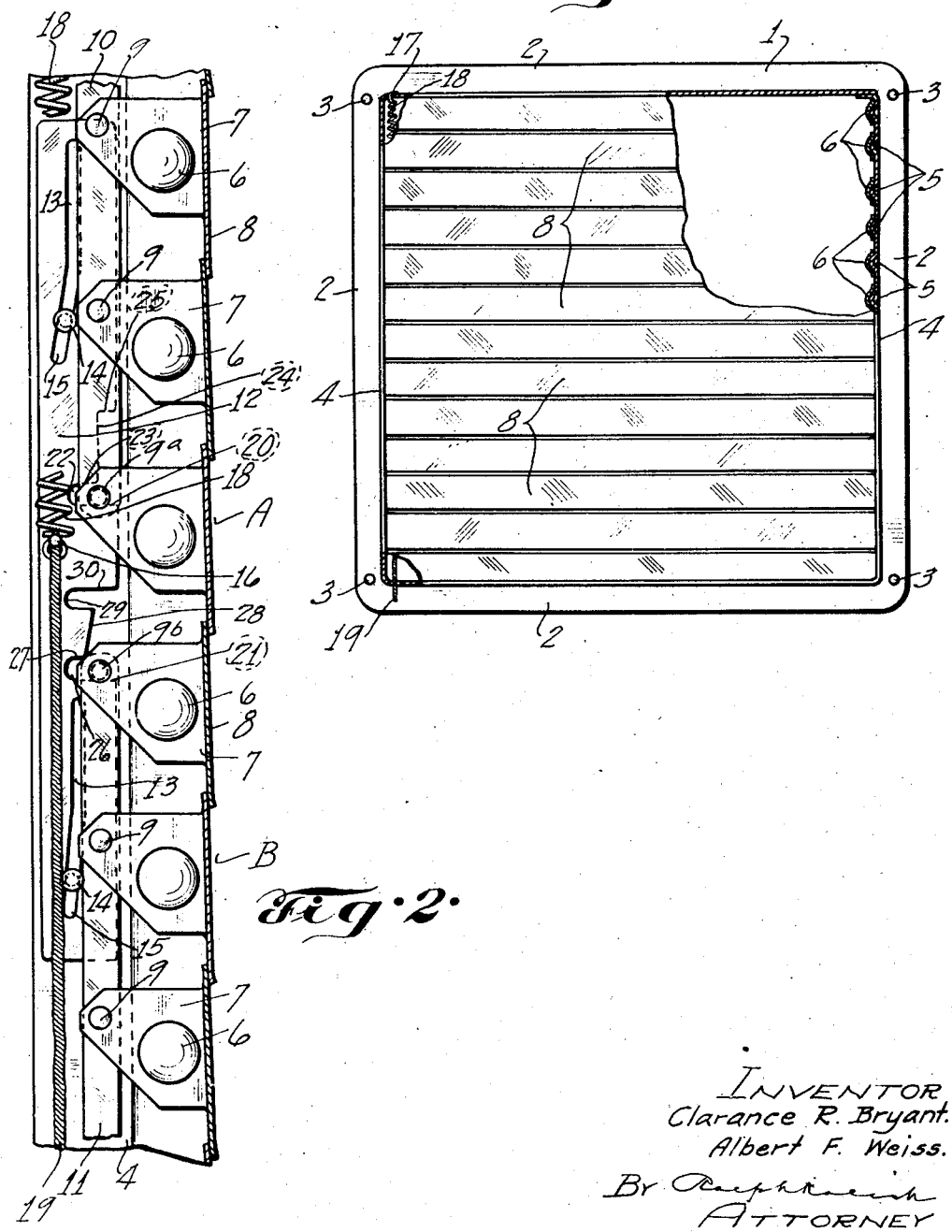
INVENTOR
Clarance R. Bryant.
Albert F. Weiss.
By
ATTORNEY March 20, 1928.
C. R. BRYANT ET AL
1,662,844
AUTOMOBILE RADIATOR SHUTTER
Filed Feb. 15, 1926
3 Sheets-Sheet 2
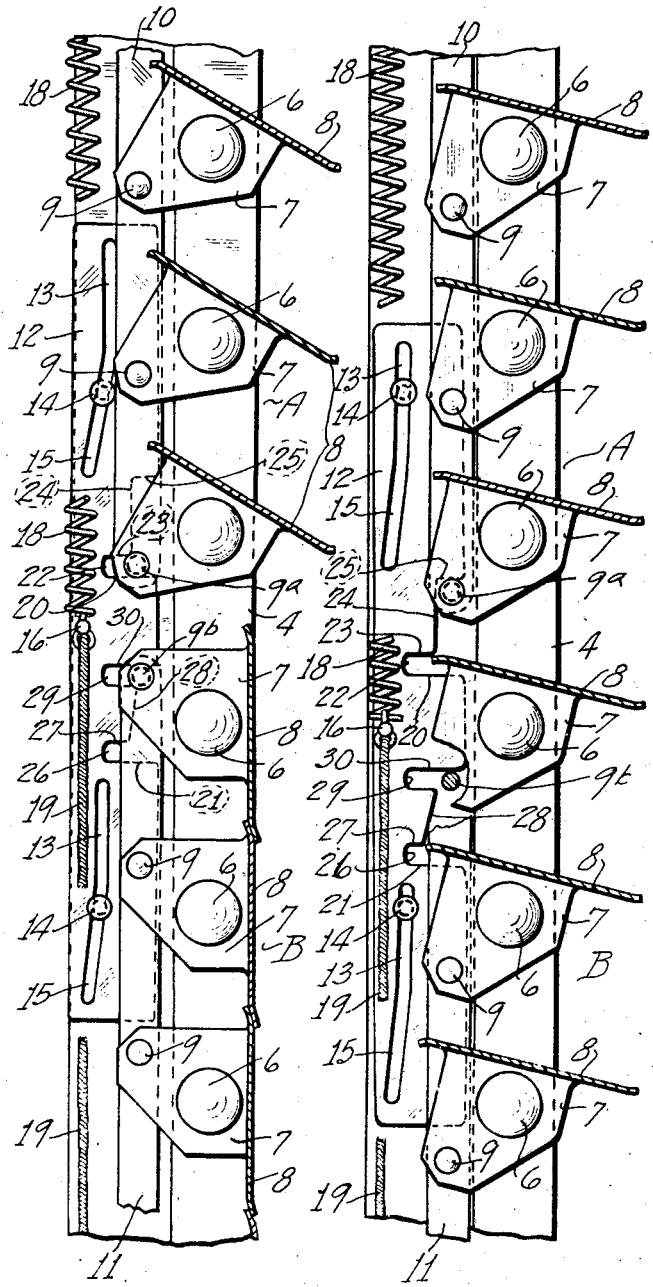
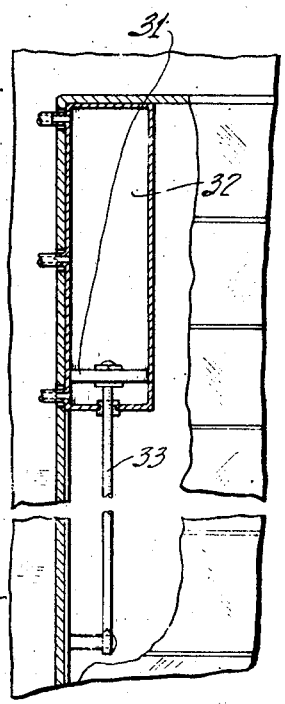
Inventors
Clarance R. Bryant.
Albert F. Weiss.
By
Attorney March 20, 1928.
C. R. BRYANT ET AL
1,662,844
AUTOMOBILE RADIATOR SHUTTER
Filed Feb. 15, 1926
3 Sheets-Sheet 3
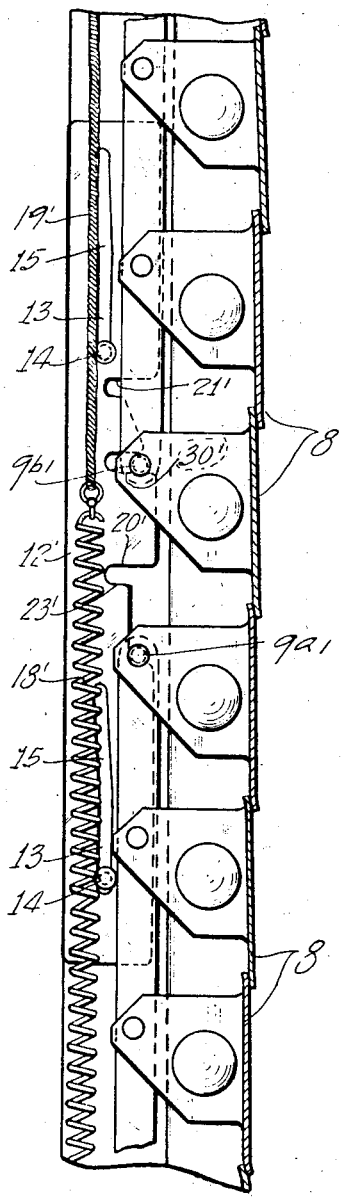
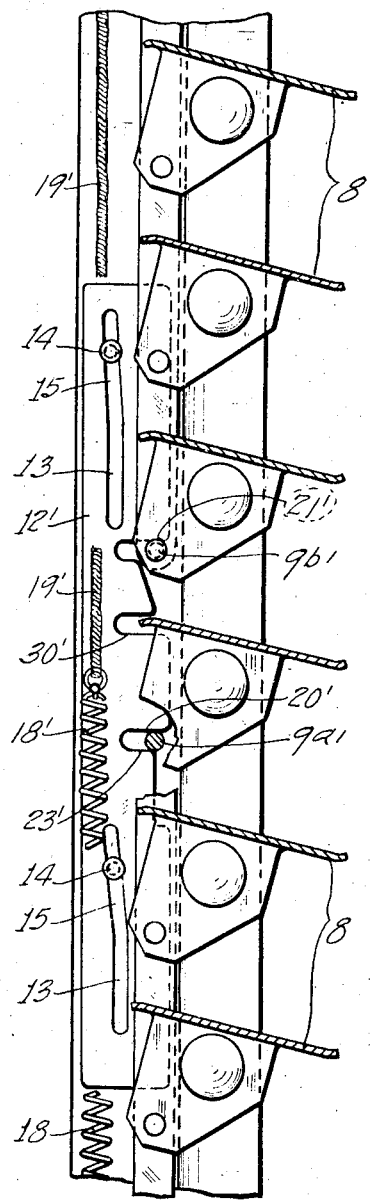
INVENTORS
Clarence R. Bryant
Albert F. Weiss
BY
ATTORNEY Patented Mar. 20, 1928.

1,662,844

UNITED STATES PATENT OFFICE.

CLARENCE ROSS BRYANT AND ALBERT F. WEISS, OF ST. LOUIS, MISSOURI.

AUTOMOBILE RADIATOR SHUTTER.

Application filed February 15, 1926. Serial No. 88,299.

This invention relates generally to automobiles and, more particularly, to a certain new and useful improvement in shutters for the radiators thereof.

During the winter months, it is desirable in protection of the engine and in prevention of possible freezing of the water of the cooling system that the circulation of air through the radiator be controlled and regulated. As a means to this end, shutters for the radiator are at present largely employed. It has, however, been found preferable that, except in extremely cold weather, to obviate over-heating of the engine, some circulation of air through the radiator be permitted and, to that end, that the radiator in its upper portion be either partially or fully open and in its lower portion, in which portion thereof freezing is most likely, closed, the radiator being fully closed in extremely cold weather and fully open both in milder as well as in warm weather.

Our present invention has hence for its chief object the provision of a shutter efficiently capable of either partially or fully opening or closing the radiator at the will or desire of the operator or driver.

Our invention has for a further object the provision of a shutter of the type and for the purpose stated which is simple, inexpensive, and durable in form and construction, which may be readily mounted upon and in operative relation with the radiator, and which may be conveniently actuated.

And with the above and other objects and advantages in view, our invention resides in the novel features of form, construction, arrangement, and combination of parts hereinafter described and pointed out in the claims.

In the accompanying drawings,

Figure 1 is a front elevational view, partly broken away and in section, of a radiator shutter embodying our invention, showing the slats thereof, in one disposition of their actuating means, normally closed;

Figure 2 is an enlarged fragmentary view, partly in elevation and partly in section, of the shutter of Figure 1;

Figure 3 is a similar view of the shutter of Figure 1, showing the upper set or group of shutter-slats in partially open condition;

Figure 4 is also a similar view of the shutter of Figure 1, showing the upper and lower sets or groups of shutter-slats in fully open condition;

Figure 5 is a fragmentary view, illustrating a power operating device for opening and closing the shutter-slats;

Figure 6 is an enlarged fragmentary view, partly in elevation and partly in section, of the shutter of our invention, showing the slats thereof, in a different or inverted disposition of their actuating means, in abnormally closed condition; and Figure 7 is a view similar to Figure 6, showing the slats, however, in normal open condition.

Referring now more in detail and by reference characters to the drawings, and first to the shutter illustrated in Figures 1, 2, 3, and 4, 1 designates a rectangular supporting-frame preferably of angular cross-section, in the base flange 2 of which are provided apertures, as at 3, for the accommodation of securing-bolts or the like for the convenient attachment of the frame 1 upon and over the front face of the automobile radiator shell.

At and along its opposite side flanges 4, the frame 1, as shown, is integrally formed with series of suitably spaced inwardly-presented aligning embossments 5 of semi-spherical formation, adapted to receive and for co-operation with outwardly-presented mating recesses or depressions 6 provided in end-ears 7 angularly projecting from suitable shutter-slats or plates 8 disposed in a series crosswise the frame 1 intermediate its side flanges 4, as best seen in Figure 1, and supported for pivotal movement through the cooperative interengagement between the embossments 5 and recesses 6.

The several shutter slats 8 are divided, in the present embodiment of our invention, into two sets or groups—a so-called upper set or group A and a so-called lower set or group B, the ears 7 at one end of the slats 8 of the upper set A being pivotally connected by studs 9 to a link-bar 10 disposed flatwise for slidable movement adjacent the frame-flange 4, and the ears 7 at one end of the slats 8 of the lower set B being in like manner pivotally connected to a second slidably shiftable link-bar 11 disposed normally in endwise aligning relation to the upper link-bar 10, whereby the several slats 8 of each set or group thereof are pivotally or swingably actuable in unison.

Disposed for slidable or shiftable movement intermediate the one side flange 4 of frame 1 and the link-bars 10, 11, is an actuator-bar 12 provided longitudinally adjacent its upper and lower ends with slots 13, fitting in which for supporting and guiding or regulating the shiftable movement of bar 12, and projecting from the frame 1, are suitably spaced headed studs 14, each of the slots 13 at its lower portion being disposed outwardly at an angle, as at 15, for the purpose of effecting a sidewise movement of the bar 12 during part of its endwise movement, as will presently more fully appear.

Attached at its one or lower end to a stud 16 disposed in approximately the longitudinal center of bar 12 and at its other or upper end to the top cross-member of frame 1, as at 17, is a coiled spring 18, under the pull or tension of which the bar 12 is normally held or retained yieldingly in its fully upwardly shifted position, with all the slats 8 of both upper and lower sets A and B in closed condition, as in Figure 1.

And connected also to the bar 12, preferably at its stud 16, is a cord 19, which, in practice, is extended to a convenient place on or within the car within easy reach of the driver, so that the operator may at will, by pulling said cord, shift the actuator-bar 12 downwardly against the tension of the spring 18 to thereby, as will now appear, swingably open either or both sets of the shutter-slats 8. Any suitable handle or manipulating device may obviously be provided for actuating and controlling said cord 19 and illustration thereof is hence omitted.

The actuator-bar 12 is notched along its inwardly or rearwardly presented edge to afford spaced shoulders 20 and 21, which, in the normal raised or elevated position of the bar and the closed condition of the shutter-slats of both sets A and B, respectively, engage the shanks of preferably the pivot stud 9ª of the lowermost shutter slat 8 of the set A and the pivot stud 9ᵇ of the uppermost shutter-slat 8 of the lower set B, as best seen in Figure 2. Under such engagement, the shutter-slats 8 of both sets thereof are yieldingly returned to and retained and held in normally closed condition by the bar 12 under the pull of the spring 18.

Adjacent the shoulder 20, the bar 12 is further somewhat deeply notched, as at 22, to afford a shoulder 23 which normally overhangs or partially overhangs the stud 9ª, while extending upwardly from the shoulder 23 is a cutaway edge-portion 24 terminating at its upper end in another shoulder 25 also overhanging the stud 9ª.

Adjacent the shoulder 21, the bar 12 is again somewhat deeply notched, as at 26, affording a shoulder 27, above which the bar 12 is cutaway affording an inclined edge-portion 28 corresponding in angularity to the inclined portions 15 of the slots 13 in the bar 12. At the upper end of the cutaway portion 28 is another relatively deep notch 29 and a shoulder 30, the latter overhanging the stud 9ᵇ.

By reference now to Figure 3 of the drawings, it will be noted that, if and when the actuator bar 12 is pulled downwardly until the shoulder 30 just comes into contact with the stud 9ᵇ, the bar 12 has, by its engagement at its shoulder 23 with the stud 9ª, shifted the upper-link 10 and thereby rocked the shuttered-slats 8 of the upper set A on their pivots 5—6 to partially open condition, the shutter-slats 8 of the lower set B remaining undisturbed in closed condition, as shown. During and throughout this partial shutter-opening movement of the bar 12 and link 10, the stud 9ª is swung through an arc of a circle having as its axis the pivots 5—6 of the adjacent shutter-slat 8. Such arcuate movement of the stud 9ª, however, is compensated and provided for by the depth of the notch 22, which permits the stud 9ª to ride therein and the shoulder 23 to continue in engagement with the stud 9ª with approximately its original degree of overhang throughout such described movement of the bar 12. It might be here observed that, to effect a closing of the upper set A of shutter-slats 8 from such described partially open condition, pull on cord 19 is released, when the actuator-bar 12 will, under the pull of spring 18, be shifted upwardly, during which movement the bar 12 engages at its shoulder 20 with the stud 9ª and reversely accomplishes swinging actuation or oscillation of the several connected upper slats 8 to closed condition.

On the other hand, if the downward movement of the actuator-bar 12 is continued from the partial shifted position thereof illustrated in Figure 3, the bar 12 at its shoulder 30 engages the stud 9ᵇ and thereby in a similar manner through actuation of the lower link-bar 11 effects the opening in unison of the slats 8 of the lower set B, the full open condition of which is clearly shown in Figure 4, the depth of notch 29 compensating for any arcuate movement of the stud 9ᵇ. During such opening movement of the lower set of slats 8, the bar 12, at its shoulder 23 continues in engagement with the upper link-bar 10, as stated and thereby simultaneously effects further swinging movement in unison of the upper set of slats 8 to likewise full open condition, the movement of the bar 12 in both shutter-opening and closing actuations being limited by the opposite end walls of the slots 13.

The shutter-slats 8, when so actuated to either stage of partial or full opening may obviously be held in such respective conditions by any suitable means for fastening the actuating cord 19 releasably in corresponding positions by the driver of the car.

Subsequently, upon the release of the cord 19 by the driver, the spring 18 yieldingly functions to restore or shift the bar 12 to its normal raised position. During the first part of such return movement, the bar 12 shifts idly and without effect upon the several shutter-slats 8 until the bar-shoulders 20 and 21 engage, respectively, with the studs $9^a$ and $9^b$, which engagement, due to the described relative location of said shoulders, occurs simultaneously and accordingly effects the closing subsequently in unison of the shutter-slats 8 of both lower and upper sets. During the shifting movements of the actuator-bar 12, the deep notches 22 and 26 compensate for arcuate movement of the studs $9^a$ and $9^b$, all of said notches 22, 26, and 29 further compensate for any sidewise shifting of the bar 12 in its lengthwise actuations as here shown, and such sidewise shifting of the bar 12 enables timely disengagement between the shoulder 23 and stud $9^a$.

Referring now to the type of our shutter specifically shown in Figures 6 and 7, the structural features and the general co-operation of parts thereof are identically similar to those heretofore described, except, as will be noted, we lengthwise invert the actuator bar 12′ and the engagement therewith of the spring 18′ and the cord 19′, so that, under the pull of the spring 18′, the groups of slats 8 are normally returned to, and yieldingly retained in, open condition. Normally then, pull on cord 19′ being released, the several slats 8 will, under the pull of the spring 18′, and the engagement between the shoulders 20′ and 21′ with the studs $9^{a\prime}$ and $9^{b\prime}$, respectively, be swingably actuated to, and yieldingly held in, fully open condition, as illustrated in Figure 7. Pull to a certain extent being now exerted on cord 19′, the actuator bar 12′ will first engage at its shoulder 23′ with the stud $9^{a\prime}$, closing of the lower set of slats being thereby effected. If the cord 19′ is now secured, it will be evident that the lower set of slats will be held closed, while the upper group of slats will remain open under the continued pull of the spring 18′. During such movement of the cord 19′, the actuator-bar 12′ has idled past the stud $9^{b\prime}$. If pull upon cord 19′, however, is continued, the actuator bar 12′ being then in engagement at its shoulder 23′ with stud $9^{a\prime}$ and also at its shoulder 30′ with the stud $9^{b\prime}$, both groups of slats will be thereby swingably actuated to fully closed condition, as illustrated in Figure 6, and retained in such condition upon a fastening of the cord 19′, the slats automatically, under the pull of the spring 18′, returning to normal open condition on a release of the cord 19′.

In some cases it may be desirable to operate the shutter-slats other than manually, as provided by the arrangement of the spring 18—18′ and the cord 19—19′. In such event, such operation may be accomplished in any suitable or approved manner, as for instance, as shown in Figure 5, by means of a piston 31 reciprocable in a cylinder 32 and connected to the actuator bar 12 by a rod 33, the reciprocations of piston 32 being effected either automatically or semi-automatically and under the power of compressed air, vacuum, or hydraulic means, as may be desired.

Our new shutter may be economically manufactured, is conveniently and easily actuable for controlling and regulating the circulation of the air through the radiator, and is exceedingly efficient in the performance of its intended functions.

It is to be understod that our new shutter may be equally well adapted to other uses than upon automobile radiators and that changes in the form, construction, arrangement, and combination of the several parts thereof may be made and substituted for those herein shown and described without departing from the nature and principle of our invention.

Having thus described our invention, what we claim and desire to secure by Letters Patent is:

1. In a shutter, in combination, a frame comprising a spaced pair of relatively fixed bars, a series of slats disposed in the frame and having engagement with said bars for pivoted actuation, a lengthwise shiftable link having pivoted connection with said slats, a lengthwise shiftable actuator-bar provided upon an edge thereof with spaced opposed shoulders, and a stud on the link disposed intermediate the shoulders, the actuator-bar being adapted at said shoulders for engagement with said stud for shifting the link to effect opening and closing actuations of the slats.

2. In a shutter, in combination, a frame comprising a spaced pair of relatively fixed bars, a series of slats disposed in the frame and having engagement with said bars for pivoted actuation, a lengthwise shiftable link having pivoted connection with said slats, a lengthwise shiftable actuator-bar provided upon an edge thereof with spaced opposed shoulders, a stud on the link disposed intermediate the shoulders, the actuator-bar being adapted at said shoulders for engagement with said stud for shifting the link to effect opening and closing actuations of the slats, and means for yieldingly shifting the actuator-bar in one direction.

3. In a shutter, in combination, a frame comprising a spaced pair of relatively fixed bars, a series of slats disposed in the frame and having engagement with said bars for pivoted actuation, a lengthwise shiftable link having pivoted connection with said slats, a stud upon the link coincident with the point of pivoted connection therewith of one of said slats, and a lengthwise shiftable actuator-bar provided upon an edge thereof with a transverse slot and an aligning shoulder and adapted at said slot and shoulder for co-operation with said stud in shifting the link to effect pivoted actuation of the slats.

4. In a shutter, in combination, a frame comprising a spaced pair of relatively fixed bars, a series of slats disposed in the frame and having engagement with said bars for pivoted actuation, a lengthwise shiftable link having pivoted connection with said slats, a lengthwise shiftable actuator-bar provided upon an edge thereof with a transverse slot and a spaced pair of opposed shoulders, one of said shoulders aligning with said slot, and a stud upon the link coincident with the point of pivoted connection therewith of one of said slats and lying intermediate said shoulders, the actuator-bar adapted at said slot and shoulders for co-operation with said stud in shifting the link to effect opening and closing actuations of the slats.

5. In a shutter, in combination, a supporting frame comprising a spaced pair of relatively fixed bars, a series of slats disposed in the frame and having engagement with said bars for pivoted actuation, a pair of lengthwise shiftable aligning links one having pivoted connection with some of said slats and the other having pivoted connection with remaining slats, the slats being thereby divided into groups, a stud on each of the links, and a lengthwise shiftable actuator-bar provided upon an edge thereof with a plurality of spaced pairs of opposed shoulders and adapted at said shoulders for engagement with said studs for shifting said links for effecting opening and closing actuations of both groups of slats.

6. In a shutter, in combination, a supporting frame comprising a spaced pair of relatively fixed bars, a series of slats disposed in the frame and having engagement with said bars for pivoted actuation, a pair of lengthwise shiftable aligning links one having pivoted connection with some of said slats and the other having pivoted connection with the remaining slats, the slats being thereby divided into groups, a stud on each of the links coincident with the point of pivoted connection therewith of one slat of each respective group, and means including a lengthwise shiftable actuator-bar cut-away and notched upon an edge thereof and thereby provided with a plurality of transverse slots and a plurality of spaced pairs of opposed shoulders and adapted at said slots and shoulders for co-operation with said studs in shifting said links for effecting opening and closing actuations of the groups of slats.

7. In a shutter, in combination, a supporting frame comprising a spaced pair of relatively fixed bars, a series of slats disposed in the frame and having engagement with said bars for pivoted actuation, a pair of lengthwise shiftable aligning links one having pivoted connection with some of said slats and the other having pivoted connection with remaining slats, the slats being thereby divided into groups, a stud on each of the links, a lengthwise shiftable actuator-bar provided upon an edge thereof with a plurality of spaced pairs of opposed shoulders and adapted at said shoulders for engagement with the respective studs for shifting said links for effecting opening and closing actuations of the groups of slats, a spring having engagement with the frame and actuator-bar for shifting the actuator-bar and sets of slats in one direction, and means for shifting said bar and sets of slats in the opposite direction.

In testimony whereof, we have signed our names to this specification.

CLARENCE ROSS BRYANT.
ALBERT F. WEISS.